United States Patent [19]

Grimm et al.

[11] 4,353,964
[45] Oct. 12, 1982

[54] PROCESS FOR THE MANUFACTURE OF A COMPOSITE FIBER COMPONENT

[75] Inventors: Wilhelm G. Grimm, Munich; Rudolf Schindler, Riemerling, both of Fed. Rep. of Germany

[73] Assignee: Messerschmitt-Bölkow-Blohm Gesellschaft mit beschrankter Haftung, Munich, Fed. Rep. of Germany

[21] Appl. No.: 223,940

[22] Filed: Jan. 12, 1981

[30] Foreign Application Priority Data

Jan. 4, 1980 [DE] Fed. Rep. of Germany ....... 3000216

[51] Int. Cl.³ .............................................. B29D 11/00
[52] U.S. Cl. ..................................... 428/408; 264/1.7; 264/2.5; 264/39; 264/81; 264/137; 264/255; 264/257; 264/258; 264/338
[58] Field of Search ................... 264/1.7, 2.4, 2.5, 1.5, 264/137, 39, 81, 255, 257, 258, 338; 428/408

[56] References Cited

U.S. PATENT DOCUMENTS

| 2,992,956 | 7/1961 | Bazinet | 264/108 X |
| 3,681,483 | 8/1972 | Moore | 264/2.4 |
| 4,017,238 | 4/1977 | Robinson | 264/2.5 |

*Primary Examiner*—Thomas P. Pavelko
*Attorney, Agent, or Firm*—Toren, McGeady & Stanger

[57] ABSTRACT

A method for the manufacture of a composite fiber component having a high surface quality wherein a glass mold having a smooth surface is coated with a separating layer which can be loosened from the surface, and then this layer is coated with a hardenable composite fiber material. This material is hardened and then separated from the mold and the separating layer. Products obtained by the process are also disclosed.

23 Claims, 3 Drawing Figures

PROCESS FOR THE MANUFACTURE OF A COMPOSITE FIBER COMPONENT

BACKGROUND OF THE INVENTION

1. Field of the Invention

The invention relates to a process for the manufacture of a composite fiber component having a high surface quality.

2. Description of the Prior Art

The main difficulty in the manufacture of composite fiber components having a very smooth, for instance, optically reflecting, surface is in obtaining a mold surface with minimum waviness and roughness from which the composite fiber material can be removed after hardening without damaging its surface. For this purpose, metal molds have usually been used. To prevent adhesion between the metal surfaces and the composite fiber material, and its hardening on the metal surfaces, liquid or pasty separating means, for example, dissolved waxes, silicone oils, or silicone pastes are burnt into the surface and then polished. However, the peak-to-valley height and waviness that can be achieved with such metal molds at the surfaces far exceeds the limitations necessary for the manufacture of composite fiber components with optically high-grade surface quality. This is due to the crystalline structure of such metal molds, as well as the appearance of alloys and formation of fine cracks at the surface, and also because after vaporization of the volatile components of the separating means, the remaining separating layer has an uneven layer thickness.

SUMMARY OF THE INVENTION

We have discovered a process for the facile production of composite fiber components having optical surface quality, i.e., those for which the maximum allowable peak-to-valley height is significantly less than 1 $\mu$m and may even be below 0.2 $\mu$m.

This is accomplished by using a glass mold having a polished surface, and uniformly covering the surface with a continuous thin separating layer which can be loosened from the surface, and then applying a hardenable composite fiber material in the unhardened state onto the separating layer and hardening said composite fiber material and separating the hardened composite fiber component from the surface.

DESCRIPTION OF THE PREFERRED EMBODIMENTS

Figure 1:
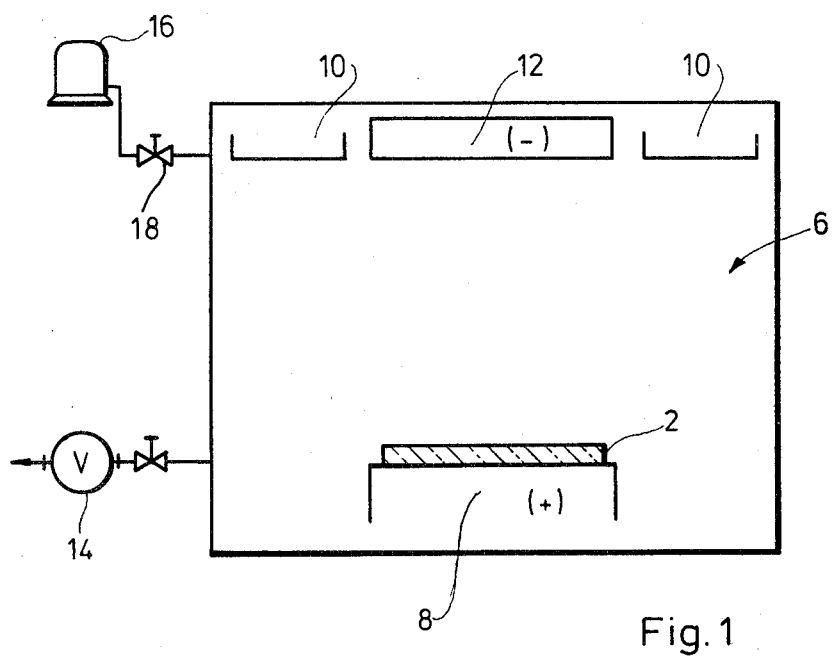
FIG. 1 is a schematic representation of a spray chamber for sputtering the separating layer onto the glass mold.

By using a glass mold whose surface quality far exceeds that of a metal mold (peak-to-valley heights of less than 0.01 $\mu$m can be achieved) as well as providing the surface of the glass mold with a special, uniformly thin, continuous coating of a separating means, free of volatile components, a composite fiber component is obtained which can be easily separated from the mold after hardening.

Furthermore, the hardened fiber component has a surface which is very precise with regard to waviness and roughness in the range of visible radiation and reflects almost without distortion. The composite fiber component manufactured according to the invention is especially suitable for special applications, such as, in the construction of satellites, where in addition to extremely low structural weight, high strength and a limited thermal coefficient of expansion, an optically high grade, mirror-smooth surface finish is required.

The separating layer can be steamed on. It is preferably applied, however, by sputtering of cathodes on the surface of the glass mold, whereby an extremely uniform layer thickness can be achieved and subsequent treatment of the separating layer, which would influence the surface accuracy of the composite fiber component is not required. Also, in order to avoid surface deficiencies caused by the application of the separating layer from a practical point of view, the separating layer is preferably not any thicker or only insignificantly thicker than the maximum allowable peak-to-valley height of the composite fiber component and has a preferred layer thickness of approximately 200 to 400 A.

As a separating means to be steamed or sputtered onto the glass, basically any material can be used which does not adhere more strongly to the glass mold than to the composite fiber material. However, it is advantageous that this separating layer consists of gold or a similar precious metal which can then be removed with a suitable solvent after the composite fiber component has been released from the mold.

In order to eliminate to a great extent those generally minor surface deficiencies which result during hardening and during the use of the composite fiber component under the effect of temperature changes, it is recommended that the thermal coefficients of expansion of the glass mold and the reinforcing fibers on the one hand, and of the synthetic resin and the reinforcing fibers on the other hand be at least approximately equal. For the same reason and in order to prevent local pressures from individual reinforcing fibers during hardening under the action of pressure, it is advantageous that the fiber arrangement be in the form of a one directional fiber band. In order to keep the interfering effect caused by shrinking of the synthetic resin components of the composite fiber material during hardening small and to ensure that the uppermost fiber layer does not stand out at the surface of the composite fiber component, it is preferable that first a very thin, pure synthetic resin layer be applied onto the separating layer. Then, the reinforcing fibers are placed only after hardening of this synthetic resin layer and graphite is mixed in with the synthetic resin to assist in limiting the shrinkage.

Hardening of the composite fiber on the glass mold is advantageously performed in autoclaves under evacuation of the mold space in order to remove possible air inclusions. In this case, the autoclave pressure is kept significantly lower than usual so that the reinforcing fibers do not press through into the separating layer and stand out on the surface of the composite fiber component.

After releasing the composite fiber component together with the separating layer, the glass mold can again be used. However, it is first cleaned, e.g., as with a solvent, to remove any possible residues.

The following process describes the manufacture of a flat composite fiber component of carbon fibers, preimpregnated with synthetic resin, with a fiber diameter d = 8 μm.

Referring to the drawings, first a glass mold in the form of a glass ceramic plate 2 is produced having a peak-to-valley height on its surfaces of approximately 0.008 μm obtained by grinding and polishing. Then, the polished surface of the glass mold is continuously coated with a closed, uniformly thin separating layer 4 of gold. The gold layer 4 is either steamed on or, as preferred, applied by sputtering of cathodes in the spray chamber 6 shown schematically in FIG. 1. This spray chamber contains a substrate holder 8, acting as the anode, onto which the glass ceramic plate 2 is placed with the polished glass surface facing upwardly. The spray chamber also contains a gold target 12, acting as cathode and is arranged between shielding elements 10.

After evacuation of the spray chamber 6 by means of a vacuum pump 14, an inert gas from a gas tank 16 is fed in via micrometer valve 18 into the chamber 6 and an electric voltage is applied between the substrate holder 8 and the gold target 12 until the glass mold surface is sputtered with a gold separating layer 4 in the desired thickness, e.g., approximately 200 to 400 Å.

Subsequently, the glass mold 2 with the gold separating layer 4 facing upwardly is placed on a heating plate and heated to approximately 100° to 120° C. Then an intermediate layer 20 of fiber-free synthetic resin in a proportion of approximately 0.1 g of resin per cm² of separating layer surface is applied. The intermediate layer 20 consists of an epoxide resin mixture which contains approximately 20% of intensively mixed graphite powder in order to minimize the shrinkage coefficient. The graphiteresin system is applied from the center to the edges of the gold separating layer 4 and any resulting air bubbles are removed by blowing hot air on the intermediate layer 20. Intermediate layer 20 is then hardened (this takes approximately 1 to 2 hours). The carbon fibers, preimpregnated with resin, are then placed in form of a composite fiber material layer 22, consisting of single directional fiber bundles, depending on the desired layer construction and layer thickness and are then covered with a multi-layer tear-off foil 24.

Figure 2:
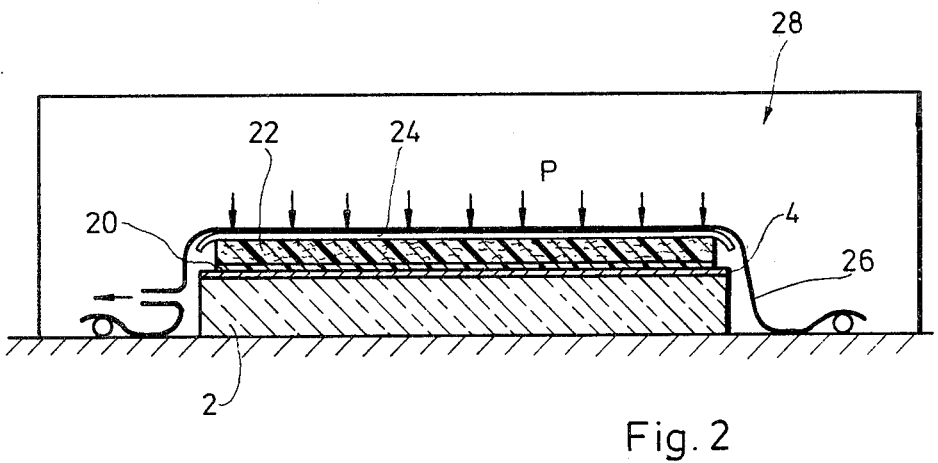
FIG. 2 shows an arrangement consisting of glass mold and composite fiber material during hardening in autoclaves.

This arrangement is then closed pressure tight by means of a flexible membrane 26 and hardened in an autoclave 28 (FIG. 2) at approximately 150° C. under evacuation of the interior space bound by the membrane 26. In order to prevent pressing through of the fiber structure, the work is performed with a reduced autoclave pressure p of approximately 0.5 to 1.0 bar. Vacuum and pressure must also be maintained during the cooling phase.

After hardening, the composite fiber component including the gold separating layer 4 is pressed off the glass mold plate 2 and the gold layer 4 can easily be removed, if necessary, by means of a solvent, for example, acetone. The completed composite fiber component then has a surface quality which is almost the same as the glass mold plate 2. The plate can again be used after cleaning with a solvent, for example, with 1-methylpyrrolidone-(2).

In order to minimize the surface inaccuracies resulting during hardening and during the use of the composite fiber component, it is best if the thermal coefficients of expansion are about the same magnitude for the glass mold plate 2, the reinforcing fibers, and the synthetic resin. Glass ceramics and carbon fibers have approximately equal thermal coefficients of expansion. However, the coefficient of expansion of the usual epoxide resin system is approximately three times as high as that of carbon fibers which results, at a temperature gradient of 150° C. and a fiber diameter d = 8 μm, in a peak-to-valley height of approximately 0.013 μm. This interfering influence, caused by different thermal expansion, can be reduced, if desired, by the selection of a suitable type of fiber or fiber mixture whose thermal coefficient of expansion is closer to that of the epoxide resin component, or possibly by maintaining the operating temperature of the composite fiber component at or close to the hardening temperature.

Figure 3:
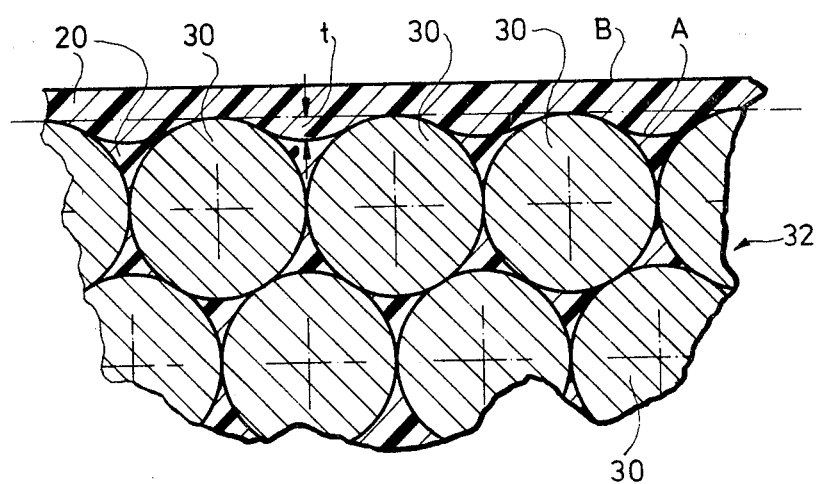
FIG. 3 is an enlarged partial representation of the surface structure of the completed composite fiber component.

Another interfering factor, impairing the surface quality of the composite fiber component, is resin shrinkage which is approximately 3%. In order to reduce this interfering factor, graphite powder is mixed with the resin system of the intermediate layer 20. If this intermediate layer only fills the spaces between the reinforcing fibers 30 of the uppermost fiber layer 32 (FIG. 3), then taking the resin shrinkage into consideration, a surface profile A, concavely curved between the individual fibers 30, with a peak-to-valley height t = 0.12 μm results. In order to further reduce the effect of resin shrinkage, the intermediate layer 20 is applied in a somewhat thicker amount and the reinforcing fibers 30 are applied onto the intermediate layer 20 only after hardening of this layer so that the component surface identified with B in FIG. 3 results.

The surfaces of the composite fiber components obtained with the described process are optically reflecting and have peak-to-valley heights of less than 0.2 μm.

What is claimed is:

1. A process for the manufacture of a composite heat hardenable fiber component having a high surface quality comprising coating the surface of a glass mold, having a smoothly worked surface, uniformly with a thin coating of a separating agent which can be detached from the mold surface, the thickness of the coating being not greater than the maximum surface roughness of the composite fiber component, applying the hardenable composite fiber material onto the coating, hardening the hardenable material and then removing the hardenable component and the coating of the separating agent from the surface of the glass mold.

2. A process for the manufacture of a composite heat hardenable fiber component having a high surface quality comprising coating the surface of a glass mold, having a smoothly worked surface, uniformly with a thin covering of a separating layer which can be loosened from the mold surface, applying a hardenable composite fiber material in the unhardened state onto the separating layer, hardening the composite fiber material, and then separating the hardened composite fiber component and the thin covering from the mold surface wherein the separating layer is applied onto the surface of the glass mold by cathodic sputtering.

3. A process for the manufacture of a composite fiber component having a high surface quality comprising coating the surface of a glass mold, having a smoothly worked surface, uniformly with a thin covering of a separating layer which can be loosened from the mold surface, applying a hardenable composite fiber material in the unhardened state onto the separating layer, hardening the composite fiber material, and then separating the hardened composite fiber component and the thin covering from the mold surface.

4. The process of claim 3 wherein the mold, after separation from the composite fiber material is cleaned with a solvent.

5. The process of claim 3 wherein the separating layer has a thickness in the range from approximately 200 to 400 A.

6. A composite fiber component produced by the process of claim 3.

7. A composite fiber component produced by the process of claim 1.

8. The process of claim 3 wherein the separating layer has a thickness not greater than the maximum surface roughness of the composite fiber material.

9. The process of claim 3 wherein any separating layer which adheres to the composite fiber material after separation from the mold is removed therefrom by washing with a solvent.

10. The process of claim 3 wherein the fibers are arranged in a single direction in the composite fiber material.

11. The process of claim 3 wherein the composite fiber material is hardened in an autoclave and the surface adjacent the fiber material is evacuated.

12. The process of claim 11 wherein the pressure in the autoclave is 0.5 to 1.0 bar.

13. The process of claim 3 wherein a thin layer of a fiber-free hardenable synthetic resin is applied onto the separating layer prior to application of the composite fiber material.

14. The process of claim 13 wherein the hardenable fiber-free synthetic resin is hardened and the composite fiber material is applied thereto.

15. The process of claim 13 or 14 wherein the thickness of the fiber-free synthetic resin layer is less than the diameter of the fibers in the composite fiber material.

16. The process of claim 13 wherein said fiber-free hardenable synthetic resin contains up to about 30% graphite.

17. The process of claim 13 wherein the thermal coefficient of expansion of the synthetic resin and the composite fiber material are essentially the same.

18. The process of claim 3 wherein the composite fiber component, after separation, is optically reflecting and has a peak-to-valley height of less than 0.2 $\mu$m.

19. The process of claim 3 wherein the surface of the glass mold has a peak-to-valley height of not greater than about 0.008 $\mu$m.

20. The process of claim 3 wherein the separating layer is applied onto the surface of the glass mold by cathodic sputtering.

21. The process of claim 3, 18 or 19 wherein the separating layer is a precious metal.

22. The process of claim 3 wherein the thermal coefficient of expansion of the glass mold is approximately equal to that of the fibers of the composite fiber material.

23. The process of claim 3 or 22 wherein the mold is a glass ceramic mold and the fibers in the composite fiber material are carbon fibers.

* * * * *